US009852525B2

(12) United States Patent
Choi (10) Patent No.: US 9,852,525 B2
(45) Date of Patent: Dec. 26, 2017

(54) METHOD AND APPARATUS FOR PROVIDING PANORAMA IMAGE DATA

(71) Applicants: Vatech Co., Ltd., Gyeonggi-do (KR); Vatech Ewoo Holdings Co., Ltd., Gyeonggi-do (KR)

(72) Inventor: Sung Il Choi, Gyeonggi-do (KR)

(73) Assignees: VATECH Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/352,627

(22) Filed: Nov. 16, 2016

(65) Prior Publication Data

US 2017/0061651 A1    Mar. 2, 2017

Related U.S. Application Data

(63) Continuation of application No. 14/401,726, filed as application No. PCT/KR2013/004367 on May 16, 2013, now Pat. No. 9,514,516.

(30) Foreign Application Priority Data

May 16, 2012    (KR) .......................... 10-2012-0051936

(51) Int. Cl.
*G06K 9/00* (2006.01)
*G06T 11/00* (2006.01)
(Continued)

(52) U.S. Cl.
CPC .......... *G06T 11/003* (2013.01); *G06T 3/4038* (2013.01); *G06T 5/002* (2013.01);
(Continued)

(58) Field of Classification Search
USPC ....... 382/100, 103, 128–133, 154, 162, 173, 382/181, 193, 199, 209, 219, 232, 254, (Continued)

(56) References Cited

U.S. PATENT DOCUMENTS 4,176,278 A    11/1979    Cushman
5,784,429 A    7/1998    Arai
(Continued)

FOREIGN PATENT DOCUMENTS

EP    2223653 A1    9/2010
JP    2008-086659 A    4/2008
(Continued)

OTHER PUBLICATIONS

Pedro H. M. Lira et al., "Panoramic Dental X-Ray Image Segmentation and Feature Extraction", Proceedings of Workshop of Computing Vision, Sao Paulo, Brazil, 2009, XP-002751412.
(Continued)

*Primary Examiner* — Seyed Azarian
(74) *Attorney, Agent, or Firm* — IP Legal Services, LLC (57) ABSTRACT

A method and an apparatus for providing panoramic image data by reconstructing frame images captured by a panoramic imaging apparatus, are disclosed. In reconstruction of images with multiple image layers, sizes of images reconstructed with an image layer or images to be used for a reconstruction are scaled. An image is selected by analyzing sharpness. A panoramic image is provided by combining selected image. According to the present invention, parts having unclear focal planes may be completely removed in a panoramic image and it is possible to provide an image including only with focused regions.

9 Claims, 11 Drawing Sheets

(51) Int. Cl.
  *H04N 5/232* (2006.01)
  *G06T 3/40* (2006.01)
  *G06T 5/00* (2006.01)
  *G06T 7/00* (2017.01)
  *G06T 7/13* (2017.01)
  *A61B 6/14* (2006.01)

(52) U.S. Cl.
  CPC .............. *G06T 7/0012* (2013.01); *G06T 7/13* (2017.01); *H04N 5/23238* (2013.01); *G06T 2207/10004* (2013.01); *G06T 2207/10116* (2013.01); *G06T 2207/20221* (2013.01); *G06T 2207/30036* (2013.01)

(58) Field of Classification Search
  USPC ........ 382/274–276, 284–294, 255, 305, 312; 345/419; 378/4, 21, 11, 38
  See application file for complete search history.

(56) References Cited

U.S. PATENT DOCUMENTS

| | | | |
|---|---|---|---|
| 7,397,890 | B2 | 7/2008 | Sukovic et al. |
| 8,693,624 | B2* | 4/2014 | Spartiotis ................. A61B 6/14 378/38 |
| 9,269,168 | B2 | 2/2016 | Inglese et al. |
| 2006/0203959 | A1 | 9/2006 | Spartiotis et al. |
| 2008/0019477 | A1 | 1/2008 | Spartiotis et al. |
| 2008/0063139 | A1 | 3/2008 | Pantsar et al. |
| 2010/0142673 | A1 | 6/2010 | Pantsar et al. |
| 2010/0208866 | A1 | 8/2010 | Spartiotis et al. |
| 2010/0246761 | A1 | 9/2010 | Pantsar et al. |
| 2011/0044520 | A1* | 2/2011 | Nakai ................... A61B 6/032 382/131 |
| 2011/0103659 | A1* | 5/2011 | Choi ..................... G06F 19/321 382/128 |
| 2012/0039435 | A1* | 2/2012 | Arai ........................ A61B 6/06 378/11 |
| 2012/0092334 | A1* | 4/2012 | Yoo .......................... A61B 8/00 345/419 |
| 2012/0224762 | A1* | 9/2012 | Choi ....................... A61B 6/14 382/132 |
| 2013/0003921 | A1 | 1/2013 | Spartiotis et al. |
| 2013/0329854 | A1 | 12/2013 | Spartiotis et al. |
| 2015/0146853 | A1 | 5/2015 | Spartiotis et al. |
| 2015/0213633 | A1 | 7/2015 | Chang et al. |

FOREIGN PATENT DOCUMENTS

| | | |
|---|---|---|
| JP | 2010-011910 A | 1/2010 |
| JP | 2010-148676 A | 7/2010 |
| JP | 2012-061016 A | 3/2012 |

OTHER PUBLICATIONS

K. Ogawa et al., "Development of a new dental panoramic radiographic system based on a tomosynthesis method", Dentomaxillofacial Radiology, vol. 39, No. 1, Jan. 1, 2010, pp. 47-53, XP055302062.

Europeal Patent Office, Office Action of EP Application No. 13 790 689.7, dated Sep. 23, 2016.

Korean Intellectual Property Office, International Search Report of International Application No. PCT/KR2013/004367, dated Aug. 6, 2013.

Korean Intellectual Property Office, Written Opinion of International Application No. PCT/KR2013/004367, dated Aug. 6, 2013.

* cited by examiner

METHOD AND APPARATUS FOR PROVIDING PANORAMA IMAGE DATA

CROSS REFERENCE TO RELATED APPLICATIONS

This application is a Continuation of U.S. patent application Ser. No. 14/401,726 (filed on Nov. 17, 2014), which is a National Stage patent application of PCT International Patent Application No. PCT/KR2013/004367 (filed on May 16, 2013) under 35 U.S.C. §371, which claims priority to Korean Patent Application No. 10-2012-0051936 (filed on May 16, 2012), the teachings of which are incorporated herein in their entireties by reference.

BACKGROUND

The present invention relates to a method and an apparatus for providing panoramic image data, and more particularly, to a method and an apparatus for reconstructing images captured by a panoramic photographing apparatus in accordance with a focal plane and combining clear images after extracting the clear images from the reconstructed images.

In a conventional panoramic auto-focusing algorithm, an image is provided by selecting a focal plane of a specific interest region for trajectory scan lengths with a frequency analysis and by linking the trajectories. In this case, the reconstruction is performed by selecting one trajectory for each region if depths of the focal planes of upper region/lower region (for example, the upper jaw/the lower jaw, the teeth/the roots of teeth) are different. Thus, there is a disadvantage that focal points of images cannot be perfectly reconstructed. And, an error is occurred in finding exact focal depth because an error occurrence possibility is high due to noise characteristics in an image reconstruction with the frequency analysis.

SUMMARY

Therefore, the present invention is made to solve the problems of the conventional technology, and an object thereof is to forma consecutive combined image by performing reconstruction after converting different scan lengths of projection images depending on real positions of image layers into an identical scan length.

Also, another object of the present invention is to form a consecutive combined image by dividing reconstructed respective images into uniform blocks, by performing noise removal and boundary (edge) detection, and by combining the selected images using interpolation.

According to an aspect of the present invention, there is provided a method for providing a panoramic image, the method including steps of: (a) scaling sizes of images reconstructed with an image layer or images to be used for a reconstruction in consideration of a size of a predetermined reference image according to a reference image layer; (b) selecting an image in part or full representing a predetermined region of interest clearly among scaled images; and (c) providing a panoramic image with selected image.

The step of (a) includes: (a1) changing a size of the images to be used for the reconstruction to the same size of the reference image by using information focus depths of a plurality of the image layers.

The method further includes: overlapping the images changed to have the same size with the size of the reference image by intervals predetermined according to the image layers.

The step of (b) includes: calculating scan lengths of the images to be used for the reconstruction; and changing the size of the images so that the calculated scan length corresponds to a predetermined base pixel value.

The step of (b) includes: removing noises in the scaled image with a predetermined algorithm; detecting boundary (edge) information for determining sharpness from the noise removed image; and selecting the image in part or full representing the region of interest clearly.

It is preferable that the step of selecting the image includes: obtaining sums of information on the detected boundaries; and selecting an imaging having the maximum sum among the sums.

It is preferable that the selecting a clear image at the step of (b) includes: dividing the scaled images into a plurality of blocks and selecting the clear image among the divided block images.

It is preferable that the divided multiple blocks have specific regions in block s overlapped with other block, and the clear image is selected with respect to the overlapped blocks.

It is preferable that at the step of (c), the panoramic image is provided by interpolating the selecting images with respect to the overlapped region for the overlapped blocks.

It is preferable that the step of (b) includes limiting range of image layers of analyzed image by setting a selected image layer as a seed value.

It is preferable that the image set as the seed value is an image discriminated as a clear image with respect to a predetermined specific region of the reconstructed image.

It is preferable that the method of claim 11, wherein the step of (b) includes discriminating clear images with respect to regions adjacent to the specific region as the specific region is a starting region.

It is preferable that the step of (a) includes reconstructing a plurality of projection image taken by a panoramic imaging apparatus with a preset image layer.

It is preferable that the predetermined algorithm is a noise removal filter including the typical Gaussian filter, the mean filter and the Poisson distribution conversion filter.

It is preferable that the step of detecting boundary (edge) information may be performed with the Sobel mask.

It is preferable that the images to be reconstructed are a plurality of projection images captured by a dental panoramic imaging apparatus, and the predetermined specific region is a molar part.

According to another aspect of the present invention, there is provided an apparatus for providing a panoramic image includes: an image scaling unit configured to scale sizes of images reconstructed with an image layer or images to be used for a reconstruction in consideration of a size of a predetermined reference image according to a reference image layer; an image selection unit configured to select an image in part or full representing a predetermined region of interest clearly among scaled images; and an image providing unit configured to provide a panoramic image with selected image.

It is preferable that the image scaling unit includes a size change unit configured to change size of the images to be used for the reconstruction to the same size of the reference image by using information focus depths of a plurality of the image layers.

It is preferable that the apparatus further includes an image overlapping unit configured to overlap the images changed to have the same size with the size of the reference image by intervals predetermined according to the image layers.

It is preferable that changing the size of the images includes: calculating scan lengths of the images to be used for the reconstruction; and changing the size of the images so that the calculated scan length corresponds to a predetermined base pixel value.

It is preferable that the image selection unit includes: a noise removal unit configured to remove noises in the scaled image with a predetermined algorithm; a boundary detection unit configured to detect boundary (edge) information for determining sharpness from the noise removed image; and an image selection unit configured to select the image in part or full representing the region of interest clearly.

It is preferable that the selection of selecting the image in the image selection unit includes: dividing the scaled images into a plurality of blocks and selecting the clear image among the divided block images.

It is preferable that the divided multiple blocks have specific regions in block s overlapped with other block, and the clear image is selected with respect to the overlapped blocks.

It is preferable that the panoramic image is provided by interpolating the selecting images with respect to the overlapped region for the overlapped blocks.

It is preferable that the image selection unit configured to set a selected image layer as a seed value to limit a range of image layers of analyzed image.

It is preferable that the image set as the seed value is an image discriminated as a clear image with respect to a predetermined specific region of the reconstructed image.

It is preferable that the step of (b) includes discriminating clear images with respect to regions adjacent to the specific region as the specific region is a starting region.

According to another aspect of the present invention, there is provided a method for providing a panoramic image, the method includes steps of: scaling sizes of images reconstructed with an image layer or images to be used for a reconstruction in consideration of a size of a predetermined reference image according to a reference image layer; removing noise of the images scaled to the same size by using a predetermined algorithm; detecting boundary (edge) information from the noise removed image in order to determine sharpness; selecting an image in part or full representing a predetermined region of interest clearly among scaled images; and providing a panoramic image by combining the selected image.

According to another aspect of the present invention, there is provided a computer-readable storage medium storing a program for performing steps of: scaling sizes of images reconstructed with an image layer or images to be used for a reconstruction in consideration of a size of a predetermined reference image according to a reference image layer; removing noise of the images scaled to the same size by using a predetermined algorithm; detecting boundary (edge) information from the noise removed image in order to determine sharpness; selecting an image in part or full representing a predetermined region of interest clearly among scaled images; and providing a panoramic image by combining the selected image.

According to the present invention, a complete panoramic image is formed by reconstructing images captured by a panoramic photographing apparatus in a multiple focal points reconstruction manner, by removing noise of respective regions, obtained by dividing a plurality of focal point images into many regions, with a filter, and by using a combination of optimum focal planes after selecting the optimum focal planes with a boundary detection. Therefore, it is possible to remove unclear focal plane regions and to provide a image containing regions being in focus only.

DETAILED DESCRIPTION OF EMBODIMENTS

Hereinafter, exemplary embodiments of the present invention will be described in detail with reference to the accompanying drawings. In the following description and drawings, like reference numerals are used to represent identical or similar elements. Thus, repetitive descriptions thereof will be omitted. When it is determined in the below description that specific description of known functions or configuration associated with the present invention unnecessarily makes the gist of the present invention vague, detailed description thereof will not be described.

Figure 1:
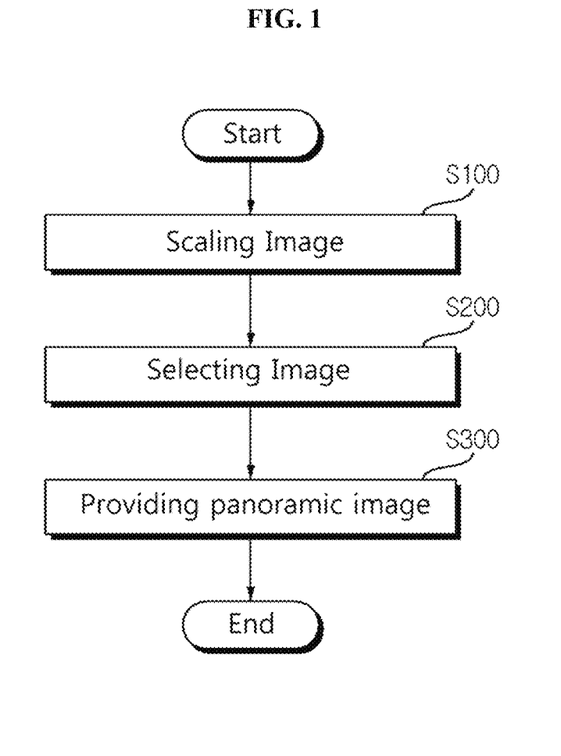
FIG. 1 is a flow chart showing a method of providing panoramic images in accordance with the present invention.

FIG. 1 is a flow chart showing a method of providing panoramic images in accordance with the present invention.

Referring to FIG. 1, a method for providing images in accordance with an embodiment of the present invention may include a step of scaling images so that reconstructed images may have same sizes S100, a step of selecting clear images S200, and a step of providing a panoramic image step 300.

Step 100 of scaling images is a step of reconstructing images captured by an imaging apparatus according to predetermined multiple image layers more than one. The term image layer refers to a virtual segment or a virtual plane comprised of segments in a three dimensional (3D) space constituted by focal points for defining or specifying a location of an object (e.g., a dental arch including teeth in case of a dental image) to be captured. If the teeth actually intended to be captured correspond to a focal plane in a dental panoramic image, the resultant panoramic image obtained may be clear. However, since the dental arrangements are different from person to person, an actual dental layer of a patient is different from an image layer defined by a panoramic image obtaining system. Such inconsistency between the actual dental layer and the image layer hinders visibility of the resultant panoramic image. Accordingly, in embodiments of the present invention, various image layers are predefined and used taking into account variety in spatial distribution of an object.

In an embodiment of the present invention, image data may be frame-based image data obtained by a panoramic image obtaining apparatus, or a reconstructed image data, e.g., a panoramic image as a final result.

In general, the panoramic image obtaining apparatus may include an X-ray source, an image sensor, and an image processing unit. The X-ray source irradiates X-rays while rotating around an object along certain trajectories. For example, the X-ray source may irradiate X-rays while rotating around the object along multiple image layer trajectories where an area of interest of the object is located. The image sensor has a certain area, and receives X-rays and obtains images along multiple image layer trajectories while moving with the X-ray source with the object located between the two. The image processing unit receives the images obtained from the image sensor and reconstructs the images for the image layer trajectories into a panoramic image for a final trajectory. In an embodiment of the present invention, the image layer trajectories include dental arch area by means of a capturer.

At a step of scaling image S100, a size of a reconstructed image of frame images taken by the panoramic image obtaining apparatus or the frame image to be used for image reconstruction may be changed. In the scaling step S100, if the image is to be scaled is a reconstructed image, it is preferable to change the size of the reconstructed image in consideration of the size of a predetermined reference image. The pre-determined reference image of this embodiment is preferably of an image reconstructed according to the corresponding image layer in the general dental arch surface in consideration of the physical information of the patient. It is preferable that the physical information may include age, gender, height, and the weight. According to the present embodiment, in the step of scaling the image S100, it is desirable to enlarge or reduce the size of the image to the same size as the reference image according to the image layer reflecting the physical information. In the step of scaling the image S100, it is preferable to change the sizes of the reconstructed image to a predetermined image size.

Figure 2:
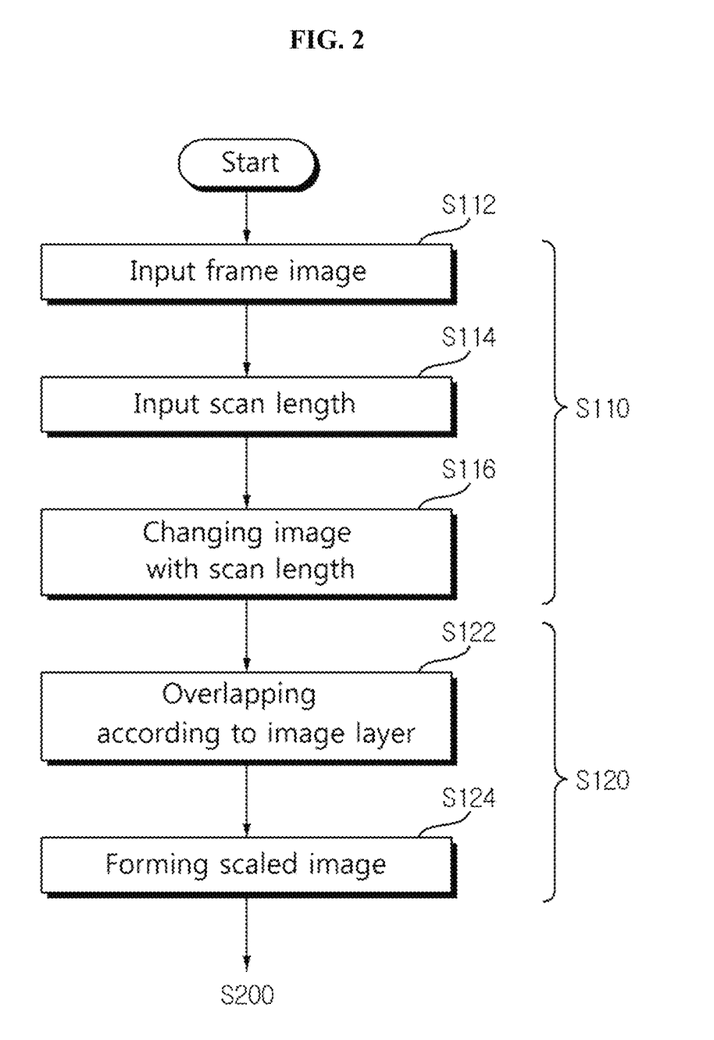
FIG. 2 is a diagram illustrating differences of scan plane lengths depending focus depths.

Referring to FIG. 2, when the image to be scaled in the step of scaling the image S100 is a frame image will be described in detail. FIG. 2 is a flow chart showing the details of image reconstruction method according to an embodiment of the present invention. Referring to FIG. 2, the step of scaling an image S100 may include a step of changing the size of the image S110, and a step of overlapping the changed image S120.

In the step of changing the size of the image S110, a frame image taken by a panoramic imaging apparatus S112 is input, scan lengths according to a depth (focus depth) of the image layer on the frame image (S114) is input, and the sizes of the images to be overlapped are changes to the same size by using a scanning length S116.

According to the present embodiment, the depth refers to a distance between the panoramic imaging apparatus and the image layer, and it is preferred to mean relative extents of protrusion of the image layers to the dental arch photographed by the panoramic imaging apparatus. According to the present embodiment, the scan length means a relative length in a region of interest when X-rays irradiated from the panoramic imaging apparatus pass through the region of interest to be examined. As depth of the image layer becomes deeper, the scan length of the X-ray is increased.

Figure 3:
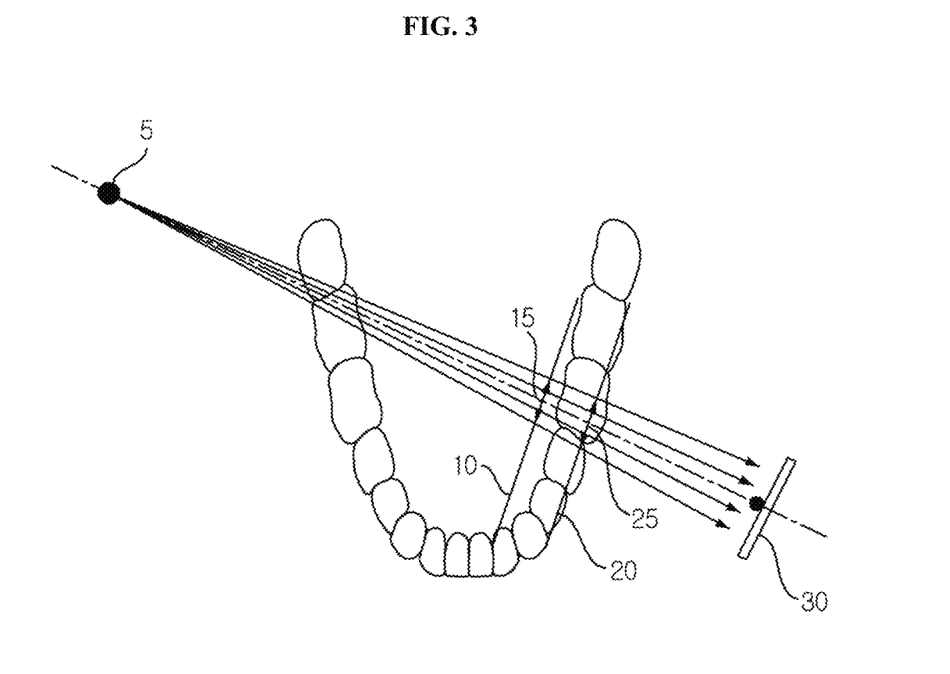
FIG. 3 is a diagram illustrating an example of converting the scan plane lengths shown in FIG. 2 into an identical magnitude.

Referring to FIG. 3, the scan length of a first scanning plane 15 of a first image layer 10 is relatively shorter than the scan length of a second image layer 20 of a second scan plane 25. Accordingly, it is preferred to change the sizes of the images to the same size using the lengths of the scan surfaces according to the depth of the image layers, since the relative size of the region of interest in the image input from the image sensor 30 varies depending on the image layer, even if the X-ray 5 irradiated from the panoramic imaging apparatus is transmitted through the same part of the region of interest. According to this embodiment, the scan lengths in the image layers are calculated based on the width of X-rays irradiated by the panoramic imaging apparatus, and it is preferable to change the size of the image so that the scan length of the frame image for the region of interest to be scanned corresponds to a predetermined reference pixel value. It is preferred that the predetermined reference pixel value in this embodiment is a value to achieve the scan length of the region of interest in each image frame to a one pixel.

At a step of overlapping the changed image 120, the frame image to be overlapped are selected from the images of which sizes are changed in the step S110, the selected frame image are overlapped at a predetermined interval S122 and, and finally the overlapped scaled image are generated S124. The predetermined interval means a degree of overlapping of the frame images according to a depth of the image layer when the frame images are overlapped by a graphics unit including a pixel to produce a panoramic image. According to this embodiment, it is preferable that the overlapping degree is reduced when the depth of the image layer is relatively a longer, and the amount of overlap can be variable in accordance with the original scan lengths of the frame image when the frame image is scaled to the same size.

Figure 4:
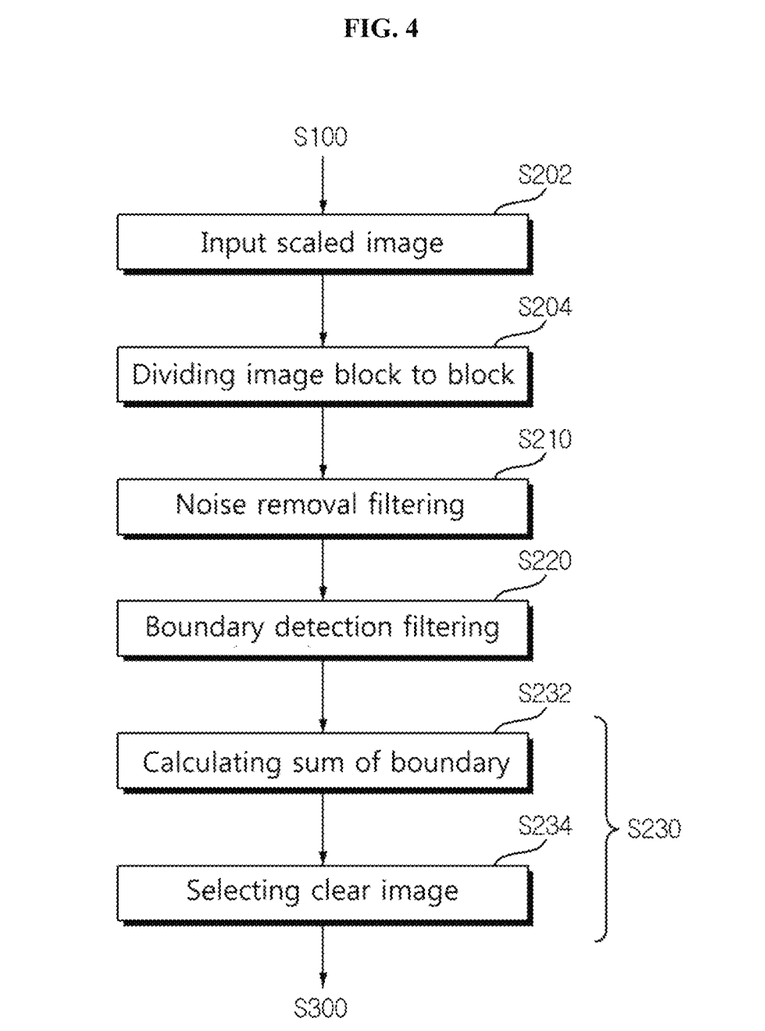
FIG. 4 is a flow chart showing detailed steps of selecting optimum images with a method of providing panoramic image of FIG. 1.

At a step of selecting an optimal image having optimum sharpness S200, the sharpness of the image reconstructed to have the same size in the step of scaling S100 are analyzed, and an image having the best clarity is selected. The step of selecting the image S200 will be described more in detail with reference to FIG. 4. FIG. 4 is a flow chart showing the selection of the optimum image in detail with the panorama image providing method shown in FIG. 1.

The step of selecting the image S200 may include a step of removing noises existing in the image S210, detecting a boundary from the image where the noise is removed S220, and selecting an optimum image by using the detected boundary information S230.

Prior to the step of removing the noise S210, it is preferred to perform a receiving step S202 for receiving the image scaled in the step of scaling the image S100, a step of dividing the received image on a block-by-block basis S204 and the step of removing the noise removal S210, and the step of detecting the boundary S220.

At the step of removing the noise in the image S210, any components other than the signal included in the image information are removed. Noise other than the component contained in the original image can be caused by external light or reflection of a signal, and the noise includes a meaningless signal of constant level which exists in the natural world.

In all images, the noise component is always present due to a system noise of an apparatus and a X-ray distribution, and an image with an amplified noise it may be selected when the noise components is stronger than the signal level of the image. In order to prevent this, a predetermined algorithm is applied to respective partial images. The predetermined algorithm may be a noise removal filter including the typical Gaussian filter, the mean filter and the Poisson distribution conversion filter or the like in consideration of the X-ray distribution.

In the step for detecting the boundary information from the noise removed image S220, the boundary of the respective images, where the noises are removed at the step of removing the noise S210, are detected. According to this embodiment, it is preferable that the boundary is a plane with which the region of interest (the dental arch) to be imaged can be discriminated from background regions other than the region of interest in the panoramic imaging apparatus.

Detection of the boundary in this embodiment is preferably performed using the Sobel mask. The boundary may exist in the changing point where a brightness of the image varies from a high value to a low value or vice versa, and the shape, size and texture of an object may be shown with the boundary. The detection of the boundary is acquiring the information of boundary of the image by using these attributes, and more detail it is preferred to find pixels that correspond to the boundary surface. The detection of the boundary is to detect the contrast or brightness change rate based on the intensity. Preferably, a mask for detecting the change rate according to this embodiment is Sobel mask. Sobel mask may detect a boundary surface in any direction, and is strong against noise, and it is sensitive in a diagonal direction of the boundary than the vertical or horizontal boundaries. It is preferable that the size of the mask in this embodiment may be any one selected from 3×3, 5×5, and 7×7, the larger the size of the mask is to increase thickness of the boundary and improve sharpness. In addition, the mask may include a vertical or a horizontal mask, or a second order derivative Laplacian mask.

Figure 5:
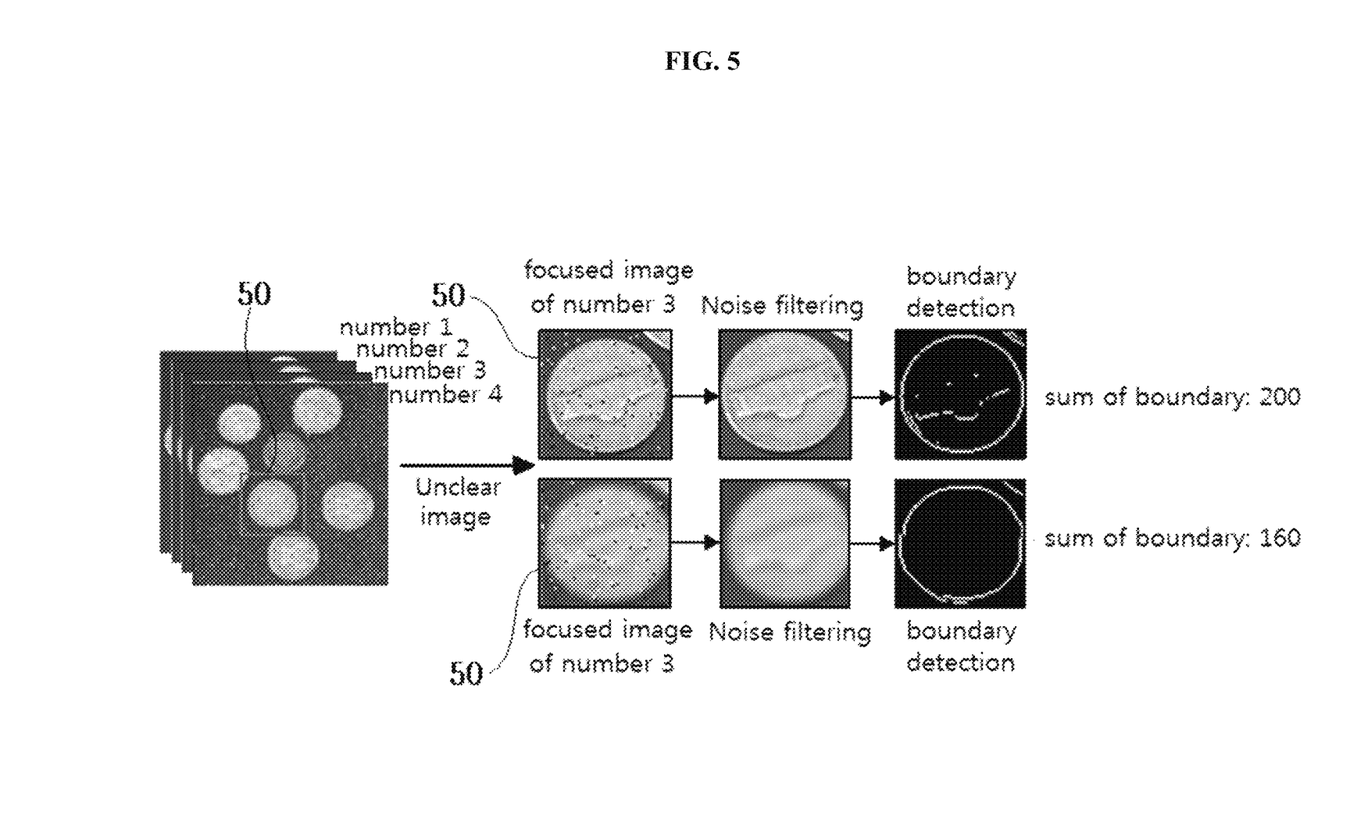
FIG. 5 is an exemplary view showing selection of optimum images by using a sum of boundary information in accordance with an embodiment of the present invention.

In step of selecting the optimal image by using the detected boundary information S230, the sharpness of the image may be analyzed by using the boundary information, and an image having optimum sharpness may be selected. In step of selecting the optimal image S230 according to the present embodiment, it is performed: a step 220 of summing the boundary surface detected in the step of detecting the boundary surface S220, and a step of selecting the clear image S234 by using the sum of boundary. The sums of the boundaries are compared, and it is preferable to select an image which has largest number of pixels at the boundaries as the optimum image. The sum of the boundary refers to the relative number of pixels in the detected boundary in the image. The step of selecting an optimal image by using the detected boundary information will be described in detail with reference to FIG. 5. FIG. 5 is an exemplary view showing selection of optimum images by using a sum of boundary information in accordance with an embodiment of the present invention. It is preferable that images 1 to 4 include a region of interest 50 in accordance with this embodiment. According to this embodiment, the sum of the boundary detected by in image 4 is 160 while the sum of the boundary detected by in image 3 is 160. Thus, it is preferable to select image 3 unless the sums of the boundaries in images 1 and 2 do not exceed 200. It is desirable that sharpness represents degree of match between the image layer and the shape of the object when an image is displayed most clearly in case that the image layer of a image coincides with the geometry of the object. According to this embodiment, it is preferable that the sharpness is the maximum when the sum of the boundary surface is maximum.

Figure 6:
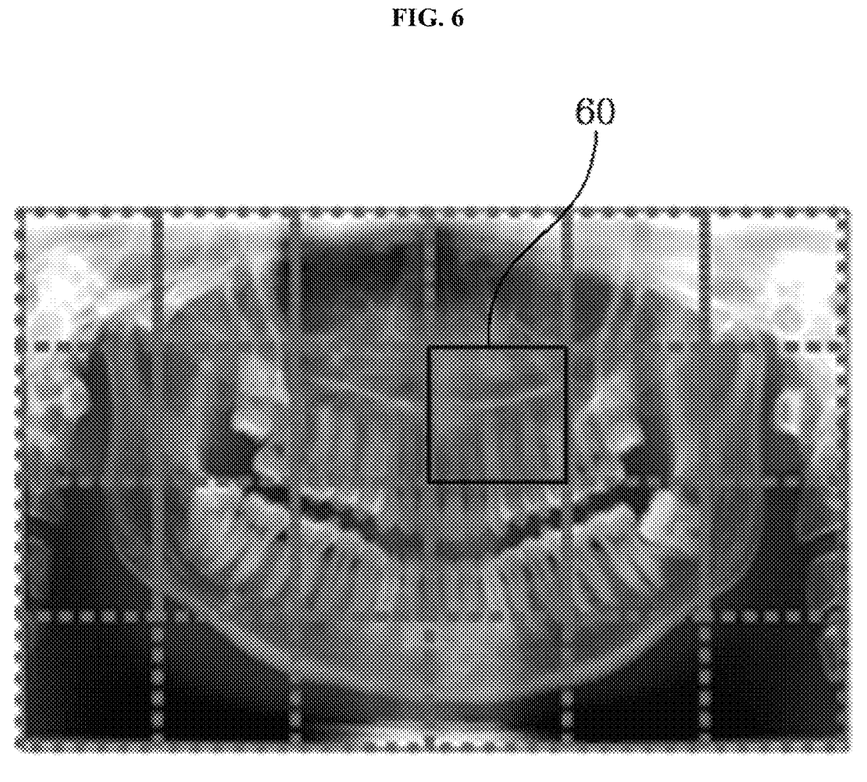
FIG. 6 is an example image divided into blocks for selecting optimum images in accordance with an embodiment of the present invention.

In step of selecting the image S200 according to the present embodiment, it is preferable to divide an image into a plurality of blocks and to analyze the sharpness with respect to the divided images. Dividing the image into blocks will be described with FIG. 6. FIG. 6 is an example image divided into blocks for selecting optimum images in accordance with an embodiment of the present invention. According to the present embodiment, it is preferable to divide an image of a dental arch into blocks 60 and to select an image having optimum sharpness for each divided image.

Figure 7:
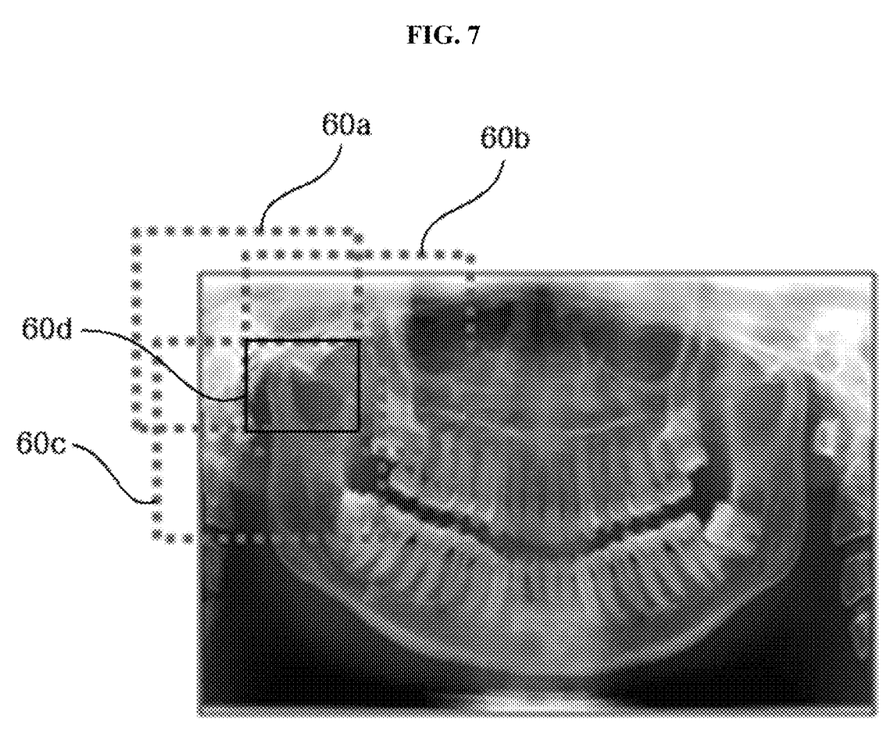
FIG. 7 is an example image divided into overlapped blocks for selecting optimum images in accordance with an embodiment of the present invention.

In accordance with another embodiment of the present invention, in the step of selecting the image S200), as shown in FIG. 7, it is preferable that images are divided into image blocks 60a, 60b and 60c overlapping and sharing some parts of the image, and the sharpness of the divided images are analyzed. FIG. 7 is an example image divided into overlapped blocks for selecting optimum images in accordance with an embodiment of the present invention. Three image blocks 60a, 60b and 60c divided with dot lines share a portion, and the sharpness of the overlapping blocks are analyzed.

In a step of providing a panoramic image S300, the image selected in the step of selecting the image S200 are combined to generate a single combined image. In generation of the combined image according to the present embodiment, it is preferred to divide the image into a plurality of blocks and to combine the image selected as the optimum image for the divided image. If the image is divided into blocks 60a that do not have overlapping parts as shown in FIG. 6, the block phenomena may be generated in the combined image because the image layers corresponding to the respective blocks are different. With the block phenomenon, boundaries which do not exist in the actual object occur in some portions of the image. This will be described in detail with reference to FIG. 8.

Figure 8:
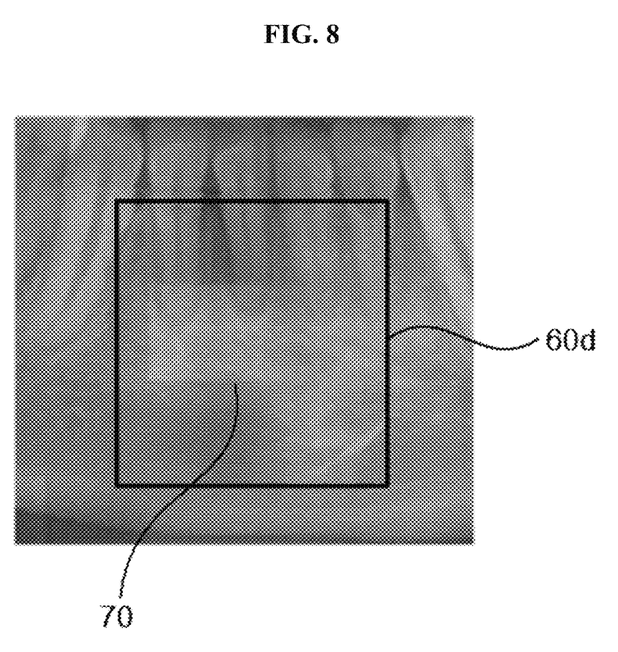
FIG. 8 is an exemplary view showing block phenomenon caused by differences of image layers in combining selected images in accordance with an embodiment of the present invention.

FIG. 8 is an exemplary view showing block phenomenon caused by differences of image layers in combining selected images in accordance with an embodiment of the present invention. According to FIG. 8, the block phenomenon was generated in an image of an apical portion 70 among blocks denoted with solid lines. In order to remove the block phenomenon, at the step of forming a combined image S300, it is preferable to combine the optimum images selected at the step of selecting images S200 after performing interpolation with the selected image. It is preferable that the images to be interpolated and combined are the images which had divided into overlapped blocks sharing some parts of the image and selected by analyzing the sharpness of the divided images. The interpolation may be performed to a specific region shared by the image in the selected image by estimating a image layer for the specific reason using the image layer of at least one image sharing the specific region.

Figure 9:
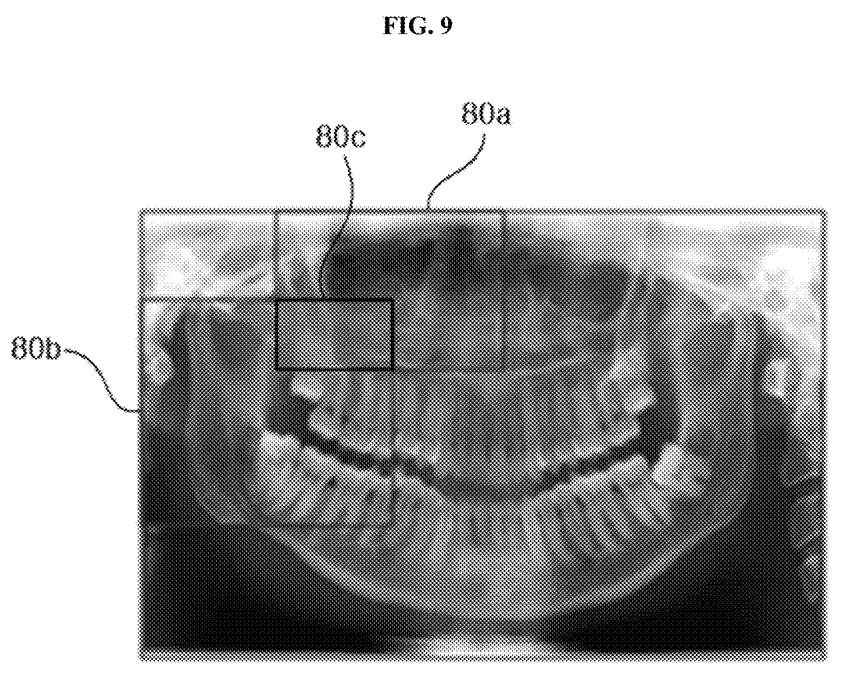
FIG. 9 shows an exemplary view showing an interpolation for removing the block phenomenon shown in FIG. 8 in accordance with an embodiment of the present invention.

Referring to FIG. 9, FIG. 9 shows an exemplary view showing an interpolation for removing the block phenomenon shown in FIG. 8 in accordance with an embodiment of the present invention. According to the embodiment, it is preferable to estimate an image layer for a specific region 80C shared by two blocks 80a and 80b shown in FIG. 9, by using the interpolation.

Figure 10:
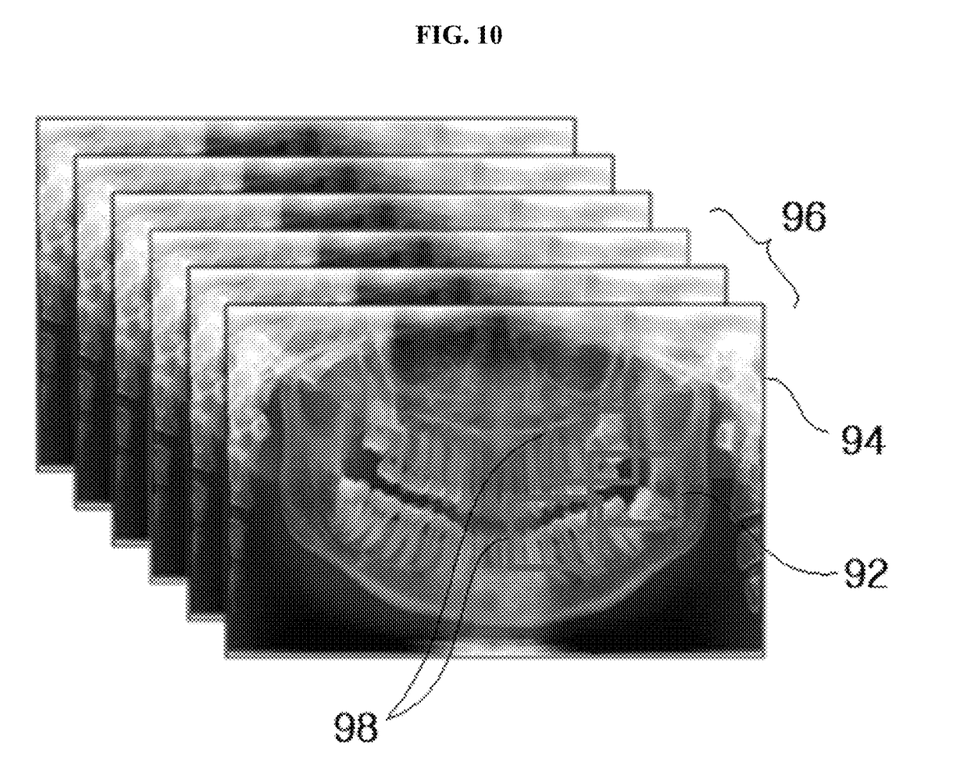
FIG. 10 shows an example of limiting a selection range for optimum images using one selected optimum image as a seed in accordance with an embodiment of the present invention.

If it impossible to remove the noise completely in the step of removing the nose S210 or the depths of image layers of adjacent images, among the images selected in the step of selecting the image S200, are changed rapidly, the image generated in the step of combining the images S300 may include a region where a connection part is not continuous. In yet another embodiment, at the step of generating the combined image S300, it is preferable that a range of the images analyzed at the step of selecting images S200 may be limited with an image selected at the at the step of selecting images S200 as a seed value (initial value). Referring to FIG. 10, an image set to as the seed value in this embodiment is preferably an image selected as the optimum image for the block having minimum noise. For images captured by a dental panoramic imaging apparatus, it is desirable to set an optimum image for a block including posterior part 92 as the seed valued. Limitation of the range of the image, it is preferable to use the depth of the image set to the seed value. By using the depth, it is preferred to analyze images 96 for the image layers having the depth within a predetermined range based on the depth of the image set to as the seed value. The limited images are preferably images which are neighboring the blocks 98 of the block of the image set as the seed value. Comprising sorting the images according to the present embodiment (S200) In the step of selecting the image S200 in accordance with an embodiment, it is preferable to analyze the sharpness by extending the neighboring blocks repeatedly based on the block of the image set as the seed value.

Figure 11:
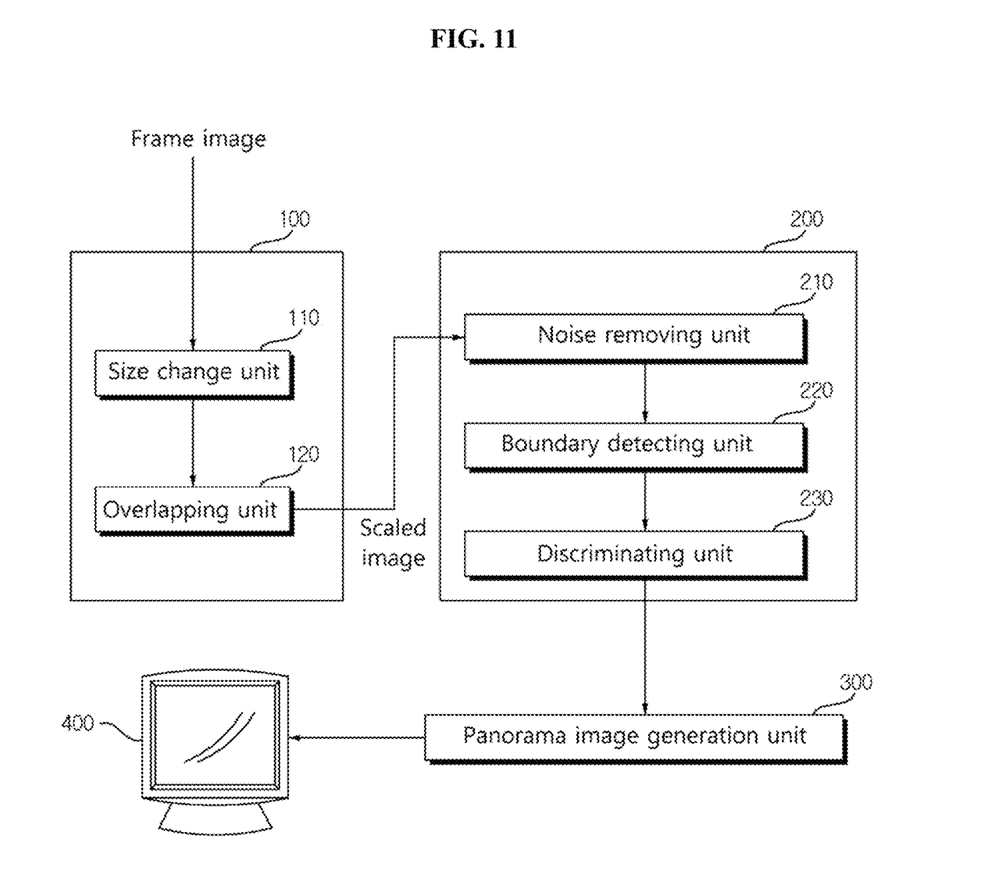
FIG. 11 a block diagram showing an apparatus for providing images in accordance with an embodiment of the present invention.

In a step of providing a panoramic image S300, the image generated by combining the optimum image selected in the step of selecting the image S200 is provided Through a display unit 400.

According to this embodiment, it is preferable that in the step of scaling the image S100 a plurality of projection image taken by a panoramic imaging apparatus are reconstructed along a preset image layer. The projection image is an image formed with an X-ray received by an image sensor when a panoramic imaging apparatus radiates the X-rays by rotating around an object along a specific; trajectory, the radiated X-rays pass the object and the image sensor moving in association with the X-ray source through the subject receives the X-rays.

FIG. 11 a block diagram showing an apparatus for providing images in accordance with an embodiment of the present invention.

The Image providing apparatus 1 according to the present invention may include an image scaling unit 100 for scaling the reconstructed images of the image to have the same size, an image selection unit 200 for selecting a clear image, a panoramic image generation unit 300 for generating a panorama image with the use of the selected images, and a display unit 400 for providing users with the panoramic image.

An image scaling unit 100, as described above, is configured to scale a reconstructed image of frame images taken by the panoramic image obtaining apparatus or the frame image to be used for image reconstruction. If the image to be scaled is the reconstructed image, as described above, it is preferable to change the size of the reconstructed image in consideration of the size of a predetermined reference image. If the image to be scaled is the frame image, according to this embodiment, the frame image taken by the panoramic image obtaining apparatus are transferred and reconstructed with one or more pre-set multiple image layers. The image scaling unit 100 may include a size change unit 110 for changing the imaged to be overlapped and an overlapping unit 120 for overlapping the change image.

The image size changing unit 110 may receive the frame image taken by the panoramic image obtaining apparatus (S112) and the scan length according to the depth of the image layer on the frame image (focus depth) (S1114) and may change the size of the images to be overlapped are changed with the scan length. As mentioned above, the sizes of the images to be overlapped may be changed to the same size by using the scan length depending on the focus depth of the image layer. The image overlapping unit 120 may select the frame images to be overlapped among the images changed at the step of scaling S110 as mentioned above, overlap the selected frame images by a predetermined interval S122 and finally generate an overlapped and scaled image S124.

The image selection unit 200 may include a noise removing unit 210, a boundary detecting unit. 220 for detecting a boundary in the image from which the noise has been removed, and image discriminating unit 230 configured to discriminate the optimum image by using the information on the boundary. The image selection unit 200 may select the image having optimum sharpness by analyzing the sharpness of the image scaled in the image scaling unit 100.

As described above, the noise removing unit 210 is preferable to receive images scaled in the scaling unit 100 (S202) and to divide the received image on a block-by-block basis (S204) prior to removing the noise (S210), and thereafter the noise removing unit 210 may perform the noise remove (S210) and the boundary detection (S220).

The noise removing unit. 210 may remove the components other than the signal included in the image information (S210).

The boundary detecting unit 220 may detect tale boundary with respect to the image after removing noise by the noise removing unit 210 (S220) The image discriminating unit 230 may analyze the sharpness of the image by using the boundary information detected by the boundary detecting unit 220, and select an image having optimum sharpness (S230).

The panorama image generation unit 300 may generate a combined image (S300) by combining the clear image selected in the image selection unit 200 as described above.

The display unit 400 may receive the image generated by the image generation unit 300 and display the combined image to the user.

The method for providing panoramic image according to the embodiments of the present invention may be embodied as computer-readable codes on a computer-readable recording medium. The computer-readable recording medium is any data storage device that can store data which can be thereafter read by a computer system.

For example, the computer-readable recording medium may include a Read Only Memory (ROM), a Random Access Memory (RAM), a Compact Disc ROM (CD-ROM), a magnetic tape, a floppy disk, an optical data storage device, etc., and the computer readable recording medium can also be distributed over network coupled computer systems so that the computer readable code is stored and executed in a distributed fashion. Furthermore, functional programs, codes and code segments to implement the embodiments of the present invention may be readily inferred by programmers in the art.

The invention claimed is:

1. A method for providing a panoramic image, by an apparatus including at least one memory configured to store image data, at least one processor configured to perform operations for providing a panoramic image using the stored image data and a communication circuit configured to communicate with other entities through a communication network, the method comprising:

(a) scaling sizes of images reconstructed with an image layer or images to be used for a reconstruction in consideration of a size of a predetermined reference image according to a reference image layer;
(b) dividing the scaled images into a plurality of blocks;
(c) selecting clear blocks among the divided blocks representing a predetermined region of interest clearly among scaled images; and
(d) providing a panoramic image with the selected clear blocks, wherein the divided blocks have specific regions in blocks overlapped with other block, and the clear blocks are selected with respect to the overlapped blocks.

2. The method of claim 1, wherein step of (a) includes:
(a1) changing a size of the images to be used for the reconstruction to the same size of the reference image by using information focus depths of a plurality of the image layers.

3. The method of claim 2, wherein the step of (a) includes:
calculating scan lengths of the images to be used for the reconstruction; and
changing the size of the images so that the calculated scan length corresponds to a predetermined base pixel value.

4. The method of claim 1, wherein at the step of (d), the panoramic image is provided by interpolating the selected blocks with respect to the overlapped region for the overlapped blocks.

5. The method of claim 1, wherein the step of (a) includes reconstructing a plurality of projection image taken by a panoramic imaging apparatus with a preset image layer.

6. An apparatus for providing a panoramic image, the apparatus comprising:
at least one memory configured to store image data,
at least one processor configured to perform operations for providing a panoramic image using the stored image data and
a communication circuit configured to communicate with other entities through a communication network,
wherein the at least one processor comprises:
an image scaling unit configured to perform operations for scaling sizes of images reconstructed with an image layer or images to be used for a reconstruction in consideration of a size of a predetermined reference image according to a reference image layer, and dividing the scaled images into a plurality of blocks;
an image selection unit configured to perform operations for selecting image with clear blocks among the divided blocks representing a predetermined region of interest clearly among scaled images; and
an image providing unit configured to perform operations for providing a panoramic image with the selected clear blocks, and
wherein the divided multiple blocks have specific regions in blocks overlapped with other block, and the clear blocks are selected with respect to the overlapped blocks.

7. The apparatus of claim 6, wherein the image scaling unit includes a size change unit configured to change size of the images to be used for the reconstruction to the same size of the reference image by using information focus depths of a plurality of the image layers.

8. The apparatus of claim 7, wherein changing the size of the images includes:
calculating scan lengths of the images to be used for the reconstruction; and
changing the size of the images so that the calculated scan length corresponds to a predetermined base pixel value.

9. The apparatus of claim 6, wherein the panoramic image is provided by interpolating the selected blocks with respect to the overlapped region for the overlapped blocks with respect to the overlapped region for the overlapped blocks.

* * * * *